US008832738B2

(12) United States Patent
Shanks et al.

(10) Patent No.: US 8,832,738 B2
(45) Date of Patent: Sep. 9, 2014

(54) INTERACTIVE MOSAIC CHANNEL VIDEO STREAM WITH ADDITIONAL PROGRAMMING SOURCES

(75) Inventors: David E Shanks, Los Angeles, CA (US); David E. Feldstein, Santa Monica, CA (US); Richard F. Purpura, Orange, CA (US); Matthew J. Thompson, El Segundo, CA (US); Mark A. Shurgot, Hollyglen, CA (US); Craig Le, Temple City, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 11/701,151

(22) Filed: Feb. 1, 2007

(65) Prior Publication Data

US 2007/0220546 A1  Sep. 20, 2007

Related U.S. Application Data

(60) Provisional application No. 60/764,460, filed on Feb. 2, 2006.

(51) Int. Cl.
*H04N 5/445* (2011.01)
*G06F 3/00* (2006.01)
*G06F 13/00* (2006.01)

(52) U.S. Cl.
USPC .......................................................... 725/39

(58) Field of Classification Search
USPC .......................................................... 725/39
See application file for complete search history.

(56) References Cited

U.S. PATENT DOCUMENTS

| 5,235,643 A | 8/1993 | Anderson et al. |
| 5,554,980 A | 9/1996 | Hashimoto et al. |
| 5,652,628 A | 7/1997 | Toyoshima et al. |
| 5,714,997 A | 2/1998 | Anderson |
| 5,946,051 A | 8/1999 | Bril |
| 6,002,394 A | 12/1999 | Schein et al. |
| 6,009,116 A | 12/1999 | Bednarek et al. |
| 6,092,806 A | 7/2000 | Follis |

(Continued)

FOREIGN PATENT DOCUMENTS

| EP | 1225768 A1 | 7/2002 |
| EP | 1233614 | 8/2002 |

(Continued)

OTHER PUBLICATIONS

International Search Report and Written Opinion of the International Searching Authority dated Jun. 19, 2007 in International Application No. PCT/US2007/002765 in International counterpart application of U.S. Appl. No. 11/701,084, filed Feb. 1, 2007.

(Continued)

*Primary Examiner* — Ricky Chin

(57) ABSTRACT

An interactive matrixed video channel presented on a monitor, with a plurality of individual video feeds being presented at a given time. An interactive matrixed video channel in accordance with the present invention comprises a plurality of video cells presenting at least video information, each video cell associated with one of the plurality of individual video feeds, and a text box, wherein statistical data is displayed within at least one of the group comprising the plurality of video cells and the text box, the statistical data generated from outside of the interactive matrixed video channel.

12 Claims, 10 Drawing Sheets

(56) References Cited

U.S. PATENT DOCUMENTS

| | | | |
|---|---|---|---|
| 6,135,881 A | 10/2000 | Abbott et al. | |
| 6,154,771 A | 11/2000 | Rangan et al. | |
| 6,177,931 B1 | 1/2001 | Alexander et al. | |
| 6,263,501 B1 | 7/2001 | Schein et al. | |
| 6,347,086 B1 | 2/2002 | Strachan | |
| 6,371,855 B1 | 4/2002 | Gavriloff | |
| 6,396,473 B1 | 5/2002 | Callahan et al. | |
| 6,405,371 B1 | 6/2002 | Oosterhout et al. | |
| 6,526,577 B1 | 2/2003 | Knudson et al. | |
| 6,536,041 B1 | 3/2003 | Knudson et al. | |
| 6,544,121 B2 | 4/2003 | DeWeese et al. | |
| 6,593,973 B1 | 7/2003 | Sullivan et al. | |
| 6,604,240 B2 | 8/2003 | Ellis et al. | |
| 6,669,565 B2 | 12/2003 | Liegey | |
| 6,750,919 B1 | 6/2004 | Rosser | |
| 6,762,798 B1* | 7/2004 | Messer et al. | 348/565 |
| 6,772,435 B1 | 8/2004 | Thexton et al. | |
| 6,802,077 B1 | 10/2004 | Schlarb | |
| 6,898,762 B2 | 5/2005 | Ellis et al. | |
| 7,010,492 B1 | 3/2006 | Bassett et al. | |
| 7,146,329 B2 | 12/2006 | Conkwright et al. | |
| 7,146,615 B1 | 12/2006 | Hervet et al. | |
| 7,174,512 B2* | 2/2007 | Martin et al. | 715/719 |
| 7,370,343 B1 | 5/2008 | Ellis | |
| 7,563,162 B2 | 7/2009 | Lawson et al. | |
| 7,757,252 B1 | 7/2010 | Agasse | |
| 7,856,646 B1 | 12/2010 | Groff et al. | |
| 8,037,494 B2 | 10/2011 | Sie et al. | |
| 2002/0010931 A1 | 1/2002 | Chew et al. | |
| 2002/0019981 A1 | 2/2002 | Schein et al. | |
| 2002/0035728 A1 | 3/2002 | Fries | |
| 2002/0038458 A1 | 3/2002 | Staal et al. | |
| 2002/0054088 A1 | 5/2002 | Tanskanen et al. | |
| 2002/0056087 A1 | 5/2002 | Berezowski et al. | |
| 2002/0067376 A1 | 6/2002 | Martin et al. | |
| 2002/0069419 A1 | 6/2002 | Raverdy et al. | |
| 2002/0099800 A1* | 7/2002 | Brainard et al. | 709/219 |
| 2002/0112238 A1 | 8/2002 | Kanojia et al. | |
| 2002/0124255 A1 | 9/2002 | Reichardt et al. | |
| 2002/0157101 A1 | 10/2002 | Schrader et al. | |
| 2002/0166123 A1* | 11/2002 | Schrader et al. | 725/58 |
| 2002/0170068 A1 | 11/2002 | Rafey et al. | |
| 2002/0188958 A1* | 12/2002 | Miller | 725/112 |
| 2003/0007092 A1 | 1/2003 | Sonner et al. | |
| 2003/0011715 A1 | 1/2003 | Kastelic | |
| 2003/0014752 A1 | 1/2003 | Zaslavsky et al. | |
| 2003/0060250 A1 | 3/2003 | Chan | |
| 2003/0079226 A1* | 4/2003 | Barrett | 725/46 |
| 2003/0084441 A1* | 5/2003 | Hunt | 725/32 |
| 2003/0110495 A1 | 6/2003 | Bennington et al. | |
| 2003/0115585 A1 | 6/2003 | Barsness et al. | |
| 2003/0126605 A1 | 7/2003 | Betz et al. | |
| 2003/0204852 A1 | 10/2003 | Fenwick et al. | |
| 2003/0208755 A1* | 11/2003 | Zimmerman | 725/34 |
| 2004/0045026 A1* | 3/2004 | Baril et al. | 725/59 |
| 2004/0060061 A1 | 3/2004 | Parker | |
| 2004/0088729 A1 | 5/2004 | Petrovic et al. | |
| 2004/0117831 A1* | 6/2004 | Ellis et al. | 725/53 |
| 2004/0117857 A1* | 6/2004 | Bisdikian et al. | 725/141 |
| 2004/0128699 A1 | 7/2004 | Delpuch et al. | |
| 2004/0255336 A1 | 12/2004 | Logan et al. | |
| 2005/0015803 A1* | 1/2005 | Macrae et al. | 725/41 |
| 2005/0028203 A1 | 2/2005 | Kim | |
| 2005/0076389 A1 | 4/2005 | Lee | |
| 2005/0138656 A1 | 6/2005 | Moore et al. | |
| 2005/0149964 A1 | 7/2005 | Thomas et al. | |
| 2005/0157217 A1 | 7/2005 | Hendricks | |
| 2005/0177850 A1 | 8/2005 | Boylan et al. | |
| 2005/0198668 A1 | 9/2005 | Yuen et al. | |
| 2005/0204383 A1 | 9/2005 | Boulanger | |
| 2005/0227757 A1 | 10/2005 | Simon | |
| 2005/0232167 A1* | 10/2005 | Gilbert et al. | 370/260 |
| 2005/0273830 A1 | 12/2005 | Silver et al. | |
| 2005/0283799 A1 | 12/2005 | Domegan et al. | |
| 2006/0010470 A1 | 1/2006 | Kurosaki et al. | |
| 2006/0015903 A1 | 1/2006 | MacBeth et al. | |
| 2006/0080709 A1* | 4/2006 | Kwon et al. | 725/46 |
| 2006/0184966 A1* | 8/2006 | Hunleth et al. | 725/39 |
| 2006/0184989 A1 | 8/2006 | Slothouber | |
| 2006/0230427 A1 | 10/2006 | Kunkel et al. | |
| 2006/0236342 A1 | 10/2006 | Kunkel et al. | |
| 2007/0011702 A1 | 1/2007 | Vaysman | |
| 2007/0124773 A1* | 5/2007 | Morris | 725/61 |
| 2007/0157221 A1 | 7/2007 | Ou et al. | |
| 2007/0157248 A1 | 7/2007 | Ellis | |
| 2008/0184296 A1 | 7/2008 | Alten et al. | |
| 2010/0077427 A1* | 3/2010 | Helms et al. | 725/32 |
| 2010/0131983 A1 | 5/2010 | Shannon et al. | |
| 2010/0153999 A1 | 6/2010 | Yates | |
| 2010/0223642 A1 | 9/2010 | Knudson et al. | |
| 2011/0001879 A1 | 1/2011 | Goldey et al. | |
| 2012/0304066 A1 | 11/2012 | Brodersen et al. | |

FOREIGN PATENT DOCUMENTS

| | | |
|---|---|---|
| WO | WO 96/37996 | 11/1996 |
| WO | WO 98/56176 | 12/1998 |
| WO | 00/05887 A1 | 2/2000 |
| WO | WO 00/05887 | 2/2000 |
| WO | 00/77752 A2 | 12/2000 |
| WO | 02/45304 A2 | 6/2002 |
| WO | WO 02/45304 | 6/2002 |
| WO | WO 2004/004322 | 1/2004 |
| WO | WO 2005/107245 | 11/2005 |
| WO | WO 2007/030380 | 3/2007 |
| WO | WO 2008/005383 | 1/2008 |

OTHER PUBLICATIONS

International Search Report and Written Opinion of the International Searching Authority dated Aug. 20, 2007 in International Application No. PCT/US2007/006066 in International counterpart application of U.S. Appl. No. 11/716,310, filed Mar. 9, 2007.

International Search Report and Written Opinion of the International Searching Authority dated Jan. 24, 2008 in International Application No. PCT/US2007/018535 in International counterpart application of U.S. Appl. No. 11/843,581, filed Aug. 22, 2007.

International Search Report and Written Opinion of the International Searching Authority dated Feb. 27, 2008 in International counterpart Application No. PCT/US2007/018306 of U.S. Appl. No. 11/833,915, filed Aug. 3, 2007 by David Shanks et al.

Non-final Office Action dated Apr. 1, 2009 in U.S. Appl. No. 11/833,915, filed Aug. 3, 2007 by David E. Shanks et al.

Non-final Office Action dated Apr. 13, 2009 in U.S. Appl. No. 11/843,581, filed Aug. 22, 2007 by David Shanks et al.

International Search Report and Written Opinion dated Nov. 24, 2008 in International Application No. PCT/US2007/006072 filed Mar. 9, 2007 by David E. Feldstein et al.

EPO Communication dated Jun. 4, 2009 in European Patent Application No. 07837016.0 filed Aug. 17, 2007 by David E. Shanks et al.

Non-final Office Action dated May 28, 2009 in U.S. Appl. No. 11/701,084, filed Feb. 1, 2007 by David E. Shanks et al.

Final Rejection dated Oct. 26, 2009 in U.S. Appl. No. 11/833,915, filed Aug. 3, 2007 by David E. Shanks et al.

Non-final Office Action dated Aug. 28, 2009 in U.S. Appl. No. 11/390,657, filed Mar. 28, 2006 by Richard F. Purpura et al.

Final Rejection dated Mar. 27, 2009 in U.S. Appl. No. 11/390,657, filed Mar. 28, 2006 by Richard F. Purpura et al.

Non-final Office Action dated Aug. 12, 2009 in U.S. Appl. No. 11/716,268, filed Mar. 9, 2007 by David E. Feldstein et al.

Final Rejection dated Jan. 21, 2010 in U.S. Appl. No. 11/390,657, filed Mar. 28, 2006 by Richard F. Purpura et al.

Final Rejection dated Mar. 4, 2010 in U.S. Appl. No. 11/716,268, filed Mar. 9, 2007 by David E. Feldstein et al.

Non-final Office action dated Jan. 6, 2011 in U.S. Appl. No. 11/953,576, filed Dec. 10, 2007 by David Eric Shanks et al.

Final Rejection dated Mar. 30, 2011 in U.S. Appl. No. 11/701,084, filed Feb. 1, 2007 by David Eric Shanks et al.

Non-final Office action dated Mar. 30, 2011 in U.S. Appl. No. 11/390,657, filed Mar. 28, 2006 by Richard F. Purpura et al.

(56) References Cited

OTHER PUBLICATIONS

Extended European search report and European search opinion dated Apr. 21, 2010 in European Patent Application No. 067396743 filed Mar. 27, 2006 by Richard F. Purpura et al.
Non-final Office action dated May 9, 2011 in U.S. Appl. No. 11/716,310, filed Mar. 9, 2007 by David E. Feldstein et al.
Mexican Office action dated Mar. 29, 2011 in Mexican Patent Application No. MX/a/2009/001980 filed Aug. 22, 2007 by David E. Shanks et al.
EPO Summons to oral proceedings dated Mar. 15, 2011 in European Patent Application No. 07837189.5 filed Aug. 22, 2007 by David E. Shanks et al.
Non-final Office action dated May 25, 2011 in U.S. Appl. No. 11/833,915, filed Aug. 3, 2007 by David E. Shanks et al.
Canadian Office action dated Mar. 3, 2010 in Canadian Patent Application No. 2,603,045 filed Mar. 27, 2006 by Richard F. Purpura et al.
Non-final Office action dated Apr. 26, 2010 in U.S. Appl. No. 11/953,576, filed Dec. 10, 2007 by David E. Shanks et al.
Non-final Office action dated Jun. 23, 2010 in U.S. Appl. No. 11/716,268, filed Mar. 9, 2007 by David E. Feldstein et al.
Final Rejection dated Aug. 27, 2010 in U.S. Appl. No. 11/953,576, filed Dec. 10, 2007 by David E. Shanks et al.
EPO communication dated Jun. 17, 2010 in European Patent Application No. 07837189.5 filed Aug. 22, 2007 by David E. Shanks et al.
Non-final Office action dated Jun. 8, 2010 in U.S. Appl. No. 11/390,657, filed Mar. 28, 2006 by Richard F. Purpura et al.
Final Rejection dated Nov. 5, 2009 in U.S. Appl. No. 11/843,581, filed Aug. 22, 2007 by David Eric Shanks et al.
Final Rejection dated Dec. 1, 2009 in U.S. Appl. No. 11/701,084, filed Feb. 1, 2007 by David E. Shanks et al.
Non-final Office action dated Nov. 10, 2010 in U.S. Appl. No. 11/701,084, filed Feb. 1, 2007 by David E. Shanks et al.
Final Rejection dated Dec. 15, 2010 in U.S. Appl. No. 11/390,657, filed Mar. 28, 2006 by Richard F. Purpura et al.
Mexican Office action dated Jun. 9, 2011 in Mexican Patent Application No. MX/a/2009/001830 filed Aug. 17, 2007 by David E. Shanks et al.
Final Rejection dated Sep. 14, 2011 in U.S. Appl. No. 11/833,915, filed Aug. 3, 2007 by David E. Shanks et al.
Non-final Office action dated Aug. 3, 2011 in U.S. Appl. No. 11/701,084, filed Feb. 1, 2007 by David E. Shanks et al.
Non-final Office action dated Jun. 6, 2011 in U.S. Appl. No. 11/843,581, filed Aug. 22, 2007 by David E. Shanks et al.
Final Rejection dated Sep. 23, 2011 in U.S. Appl. No. 11/953,576, filed Dec. 10, 2007 by David E. Shanks et al.
Final Rejection dated Oct. 4, 2011 in U.S. Appl. No. 11/390,657, filed Mar. 28, 2006 by Richard F. Purpura et al.
Final Rejection dated Oct. 4, 2011 in U.S. Appl. No. 11/843,581, filed Aug. 22, 2007 by David E. Shanks et al.
Final Rejection dated Oct. 25, 2011 in U.S. Appl. No. 11/716,310, filed Mar. 9, 2007 by David E. Feldstein et al.
Final Rejection dated Jan. 3, 2012 in U.S. Appl. No. 11/701,084, filed Feb. 1, 2007 by David E. Shanks et al.
Non-final Office action dated Jan. 4, 2012 in U.S. Appl. No. 11/953,576, filed Dec. 10, 2007 by David E. Shanks et al.
Non-final Office action dated Jan. 18, 2012 in U.S. Appl. No. 11/390,657, filed Mar. 28, 2006 by Richard F. Purpura et al.
Final Rejection dated Apr. 17, 2012 in U.S. Appl. No. 11/953,576, filed Dec. 10, 2007 by David E. Shanks et al.
Non-final Office action dated Nov. 13, 2012 in U.S. Appl. No. 11/390,657, filed Mar. 28, 2006 by Richard F. Purpura et al.
Non-final Office action dated Jun. 18, 2012 in U.S. Appl. No. 11/833,915, filed Aug. 3, 2007 by David E. Shanks et al.
Final Rejection dated May 22, 2013 in U.S. Appl. No. 11/833,915, filed Aug. 3, 2007 by David E. Shanks et al.
Final Rejection dated Mar. 1, 2013 in U.S. Appl. No. 11/390,657, filed Mar. 28, 2006 by Richard F. Purpura et al.
Non-final Office action dated Oct. 3, 2013 in U.S. Appl. No. 11/833,915, filed Aug. 3, 2007 by David E. Shanks et al.
Final Rejection dated Mar. 11, 2014 in U.S. Appl. No. 11/833,915, filed Aug. 3, 2007 by David E. Shanks et al.
Notice of Allowance dated Jan. 17, 2014 in U.S. Appl. No. 11/716,310, filed Mar. 9, 2007 by David E. Feldstein et al.

\* cited by examiner

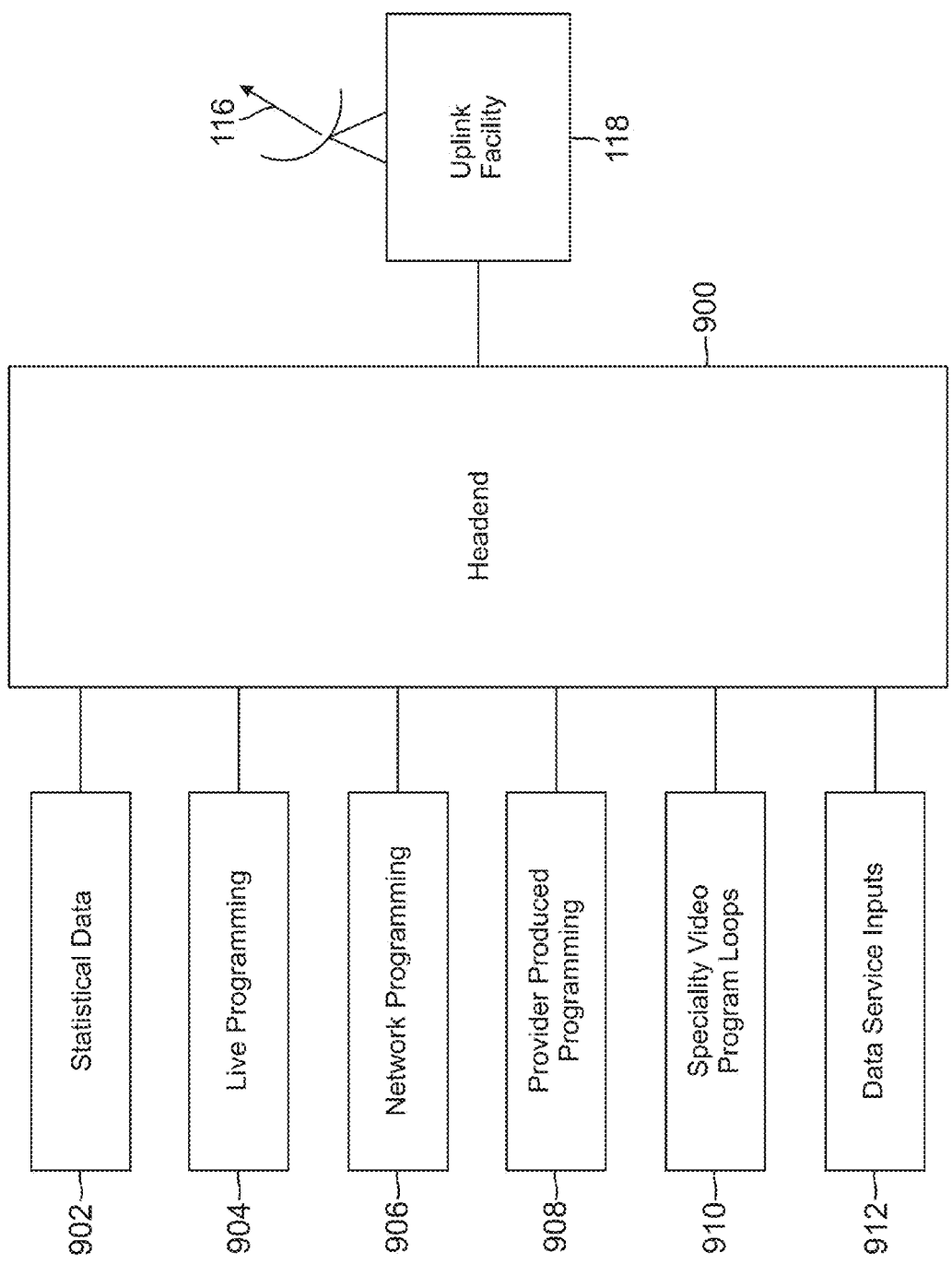

INTERACTIVE MOSAIC CHANNEL VIDEO STREAM WITH ADDITIONAL PROGRAMMING SOURCES

BACKGROUND OF THE INVENTION

1. Field of the Invention

The present invention relates generally to satellite video systems, and in particular, to a method, apparatus, and article of manufacture for interactive mosaic channel video streams with nested menu features.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses an interactive mosaic channel video with nested menu features. The present invention combines several "viewer channels" and an independent channel, and provides a nested interactive feature which allows for additional information to be presented upon user interaction with the channel or system. The matrix can be changed from a given number of matrix cells to a larger or smaller number of matrix cells during transmission. Further, the mosaic channel can include a streamer on screen to provide other information that may or may not be related to one or more of the cells of the matrix, as well as possibly being related to the barker channel. There can also be a close-captioning portion based on the selected portion of the screen, whether it is the barker channel or a selected cell of the matrix.

The present invention comprises an interactive matrixed video channel presented on a monitor, with a plurality of individual video feeds being presented at a given time. An interactive matrixed video channel in accordance with the present invention comprises a plurality of video cells presenting at least video information, each video cell associated with one of the plurality of individual video feeds, and a text box, wherein statistical data is displayed within at least one of the group comprising the plurality of video cells and the text box, the statistical data generated from outside of the interactive matrixed video channel.

The invention further optionally includes a control bar, a command displayed on the control bar selecting a screen for display on the monitor, the screen comprising information related to at least one of the video cells associated with one of the plurality of individual video feeds, a cursor, the cursor selecting one of the plurality of video cells, selection of a video cell from the plurality of video cells creating a new condition to be displayed on the monitor, the new condition comprising information related to the selected video cell being presented by the monitor, a barker cell that presents additional video and audio information that can also be selected by the cursor, the plurality of video cells being grouped by genre, the genre being a specific event, and the specific event being selected from a group comprising an Olympic Games, a NCAA basketball tournament, and a National Football League game schedule.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout:

FIG. 9 illustrates typical programming and data sources that are used within the present invention.

DETAILED DESCRIPTION OF THE PREFERRED EMBODIMENTS

Figure 1:
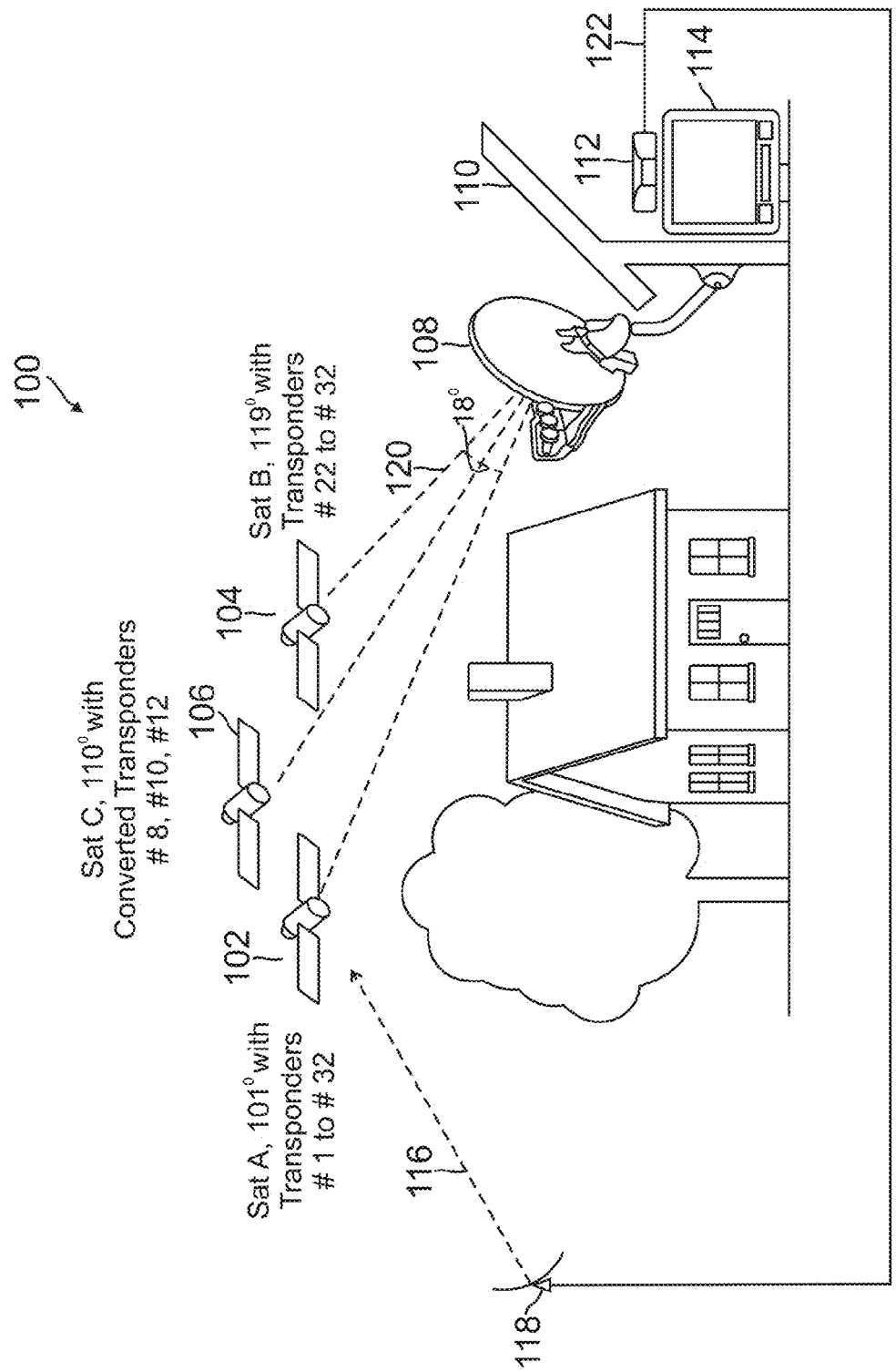
FIG. 1 illustrates a typical satellite television installation of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is an interactive television channel that allows a viewer to view a video stream and select specific audio and/or video from the video stream based on a viewer's individual desires. The video stream is typically delivered to a user's monitor 114 via system 100, but could be done using cable or other terrestrial techniques.

When a viewer watches a specific program on a monitor 114, they are watching a "viewer channel" that comprises video and audio information that is routed to a specific "channel" to the monitor 114. For example, when a viewer wants to watch the local FOX affiliate station, they know that station is associated with a specific channel number on their monitor 114 or IRD 112, e.g., channel 11. When they program or otherwise indicate to the monitor 114 or IRD 112 to tune to channel 11, the monitor 114 or IRD 112 manipulates the electronics to capture and present the video information associated with that command from the satellite downlink 120, or from another source such as a coaxial cable 122 input (cable TV) or terrestrial broadcast frequencies to present that information on monitor 114. The "viewer channel" information is typically the information that is presented when a viewer selects a given "channel" on the monitor 114 or IRD 112.

The present invention provides additional viewer channels that comprise multiple video feeds that would normally be presented to a viewer on separate viewer channels, as well as presenting unique video information that is associated with one or more of the video streams which provides additional information to the viewer.

The present invention also allows a viewer to select various portions of the video and audio presentation based on commands sent by the viewer, typically via the remote control, to select the desired video and audio that is presented. This presentation is typically referred to as an "interactive channel," an "interactive matrix channel," or an "interactive mosaic channel" herein.

Within the interactive mosaic channel, the viewer is given several choices of other viewer channels to view, either simultaneously as in a matrix view, or the viewer can choose one of the matrixed viewer channels directly from the interactive mosaic channel.

There can be more than one interactive channel as described above, and, as such each of the interactive channels can have a thematic core, genre, or subject. For example, the interactive channels can comprise a group of related channels, such as a group of viewer channels that provide news programming, a second group of viewer channels that provide sports programming, a group of channels that provide children's programming, a group of channels that provide home shopping programming, or a group of channels that is selected by the user. Other groupings can be presented, such as all of the local network affiliate channels, specialty groups such as a group of channels that provide foreign-language specific programming, pay-per-view preview channels, adult programming, etc. The present invention is not limited based on the grouping of channels matrixed together to comprise the interactive mosaic channel.

The interactive mosaic channel can be reached in a similar fashion to the other viewer channels available for viewing on monitor 114; the interactive mosaic channel can be selected from the programming guide, the interactive mosaic channel number can be entered directly on the remote control, or the interactive mosaic channel would be found when the user is "channel surfing" or using the "next higher or lower channel" button on the remote control or directly on the monitor 114 or IRD 112.

Interactive Mosaic Channel Display Diagram

Figure 2A:
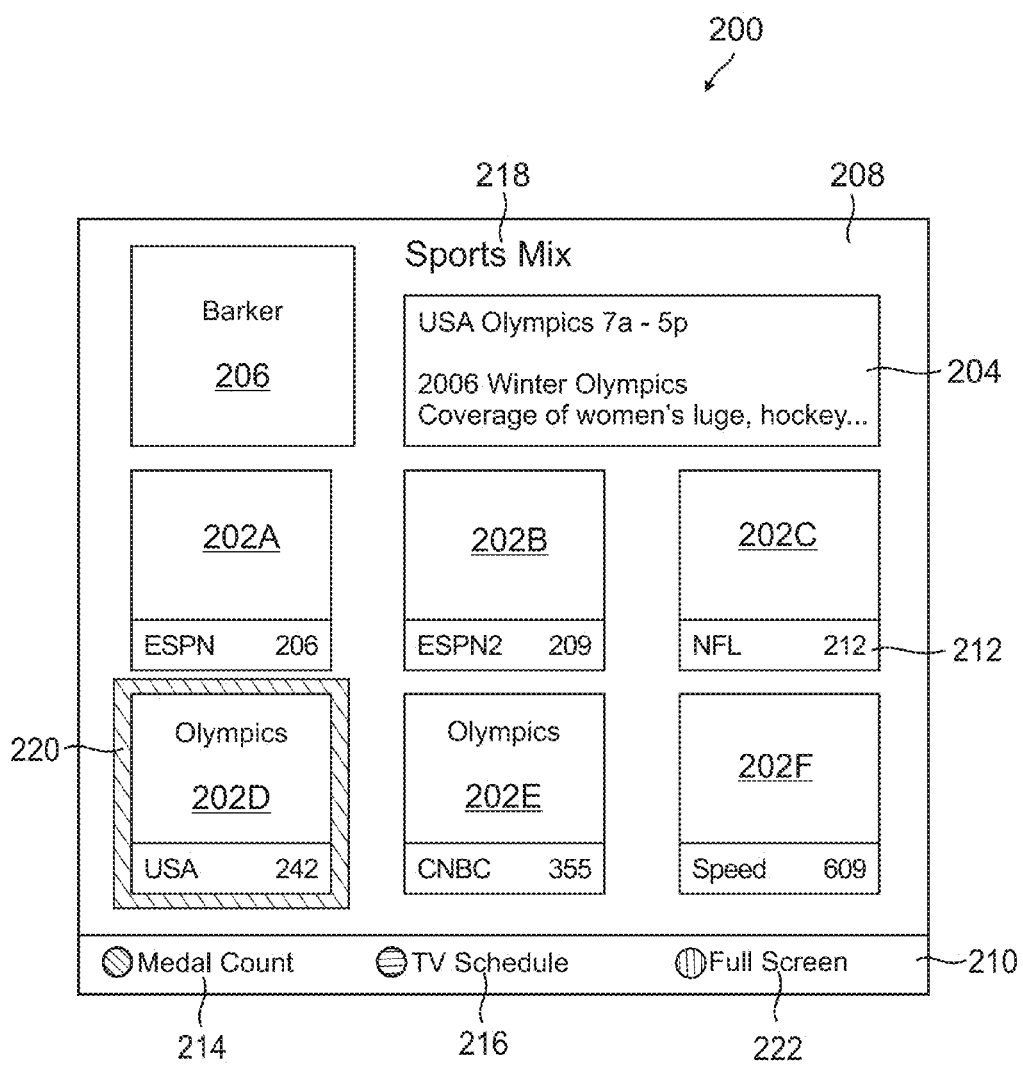
FIG. 2A illustrates a typical six-cell matrix with a generic video feed in accordance with the present invention.

FIG. 2A illustrates a typical matrix with a generic video feed in accordance with the present invention.

Interactive mosaic channel 200 is shown as being displayed on monitor 114. Within interactive mosaic channel 200, there are a number of video cells 202A-202F and a text box 204, also referred to as an On Screen Display (OSD) 204. Optionally, the interactive mosaic channel 200 further comprises a separate video cell 206, also called a "barker cell" 206, a background video 208, and a control bar 210.

The number of video cells 202A-F can change based on the number of video cells 202 A-F desired. As the number of video cells 202A-F increases, of course, there must be a reduction in the size of the video cells 202A-F to ensure that the video cells are differentiated on the monitor 114. As the number of video cells 202A-F decreases, the size of the video cells 202A-F can increase, since there is more space available on monitor 114 to display video cells 202A-F.

Further, the placement of video cells 202A-F, barker cell 206, text box 204, and ticker 210 is not limited to the positions on monitor 114 as shown in FIG. 2A. These elements can be displayed anywhere on monitor 114 without departing from the scope of the present invention.

As there are multiple video feeds and video cell 202A-F and barker cell 206 being presented, each video cell 202A-F and barker cell 206, as well as background video 208 and possibly dynamic ticker 210, have associated audio portions that can be played. Presenting more than one audio stream may be confusing; as such, it is typical that only one audio stream of information is presented at a given time. However, each of the video feeds may also have closed-captioning information associated with it, and selection of a closed-captioned presentation, rather than an audio presentation, can be performed as described herein.

Video Cells

Video cells 202A-F each contain a separate viewer channel of programming. So for example, in an interactive mosaic channel that is focused on news programming, cell 1 could contain the video programming associated with the viewer channel of FOX News Channel, cell 2 could contain the video programming associated with the viewer channel of CNN, cell 3 could contain the video programming associated with the viewer channel of Headline News, cell 4 could contain the video programming associated with the viewer channel of MSNBC, cell 5 could contain the video programming associated with the viewer channel of The Weather Channel, and cell 6 could contain the video programming associated with the viewer channel of C-SPAN. The placement and video programming content for each video cell 202A-F can depend on a wide variety of factors, such as Nielsen ratings for a given channel, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 202F to video cell 202A for a period of time. Changes in presentation for the interactive mosaic channel 200 are discussed below.

Within each of the video cells 202A-F is a channel identification (ID) box 212. Typically, the channel ID box 212 indicates to the viewer the moniker or name that is associated with the video feed being shown in that respective video cell 202A-F, and the viewer channel number associated with the video feed being shown in that respective video cell 202A-F. For example and not by way of limitation, in video cell 202A, which as described above, is showing the video feed for ESPN, channel ID box 212 would indicate "ESPN" as well as, optionally, a channel number, e.g., "206" to indicate to the viewer that the video feed being shown in video cell 202A is that of ESPN, and that the viewer is accustomed to seeing this full-monitor 114 video programming on viewer channel 206.

Other information may also appear in channel ID box 212, such as an indication that the video feed that is being presented in the associated video cell 202A-F is a "user favorite" channel, the channel ID box 212 may be presented in a different color or video texture to indicate that the video feed that is being presented in the associated video cell 202A-F is a channel that presents programming that adults may wish to block from their children's view or has closed-captioning available, etc. Many possibilities are available within the scope of the present invention to present various types of video information within channel ID box 212 for viewer selection and benefit. The channel ID box 212 may also appear without a video cell 202A-F for those video feeds that are channel blocked via parental control, or otherwise unavailable to a specific viewer because of the viewer's programming package or other reasons.

Text Box

Text box 204 contains textual information that is useful to the viewer, and this information can change depending on the viewer's selection of interactive services as described herein. For example, the text box 204 can contain a generic statement about the genre of the interactive mosaic channel 200, or statements directed to a selected video cell 202A-F or information related to the channel ID box 212 to describe to a user the meaning of the information presented in the channel ID box 212 or other information related to the video cell 202A-F and channel ID box 212. The text box can also scroll to present additional information to the viewer that does not all fit within text box 204 at a given time.

There can also be default text associated with each interactive mosaic channel 200, and, depending on the capabilities of IRD 112, each time an interactive mosaic channel 200 is tuned to, a default descriptive text shall be displayed in the text box 204.

Barker Cell

Barker cell 206 is a presentation of video data that can relate to the video cells 202A-F that are present in interactive mosaic channel 200. For those interactive mosaic channels 200 that have the optional barker cell 206, the barker cell 206 can use audio or video clues to direct the user to one of the video cells 202A-F for more information on a given topic, or provide an overview of the information presented within the video cells 202A-F. For example, the audio and video associated with barker cell 206 in a news format can be a series of stories that are being covered in more depth on the viewer channels being shown in video cells 202A-F, and the barker cell 206 audio and video can then direct the viewer to tune the IRD 112 or monitor 114 to a specific video cell 202A-F for more information on that topic. The barker cell 206 can also be used to provide an overview of the news stories, either those presented in video cells 202A-F or other news stories of interest, without directing the viewer to one of the video presentations being discussed in the video feeds shown in video cells 202A-F.

Barker cell 206 can present audio and video information that is not available on any other viewer channel that is accessible to IRD 112 or monitor 114, other than within the barker cell 206 of the interactive mosaic channel 200. When the barker cell 206 presents audio and video information that is not present on any other viewer channel accessible to IRD 112 or monitor 114, then the barker cell 206 does not have an associated channel ID box 212.

Background Video

Background video 208 is typically a backdrop for the interactive mosaic channel 200. The background video 208 can be related to the genre of the interactive mosaic channel 200; for example, in a news environment, the background video 208 can be related to a top news story, the stock market exchange building, a prominent government building, etc. The background video 208 can be changed or can be a dynamic video depending on the desires of the editorial staff or viewer preferences. Further, the background video 208 can be a logo or other indicator of the source of the interactive mosaic channel 200, such as DIRECTV.

Channel Moniker

Interactive mosaic channel 200 can also comprise a channel moniker 218, which indicates the name of the interactive mosaic channel to a viewer. For example, as shown in FIG. 2A, the interactive mosaic channel 200 has a channel moniker 218 of "Sports Mix" but this can also be event-related coverage for specific events such as the Olympics, National Football League games, or other genre monikers 218.

Interactive Features

Figure 2B:
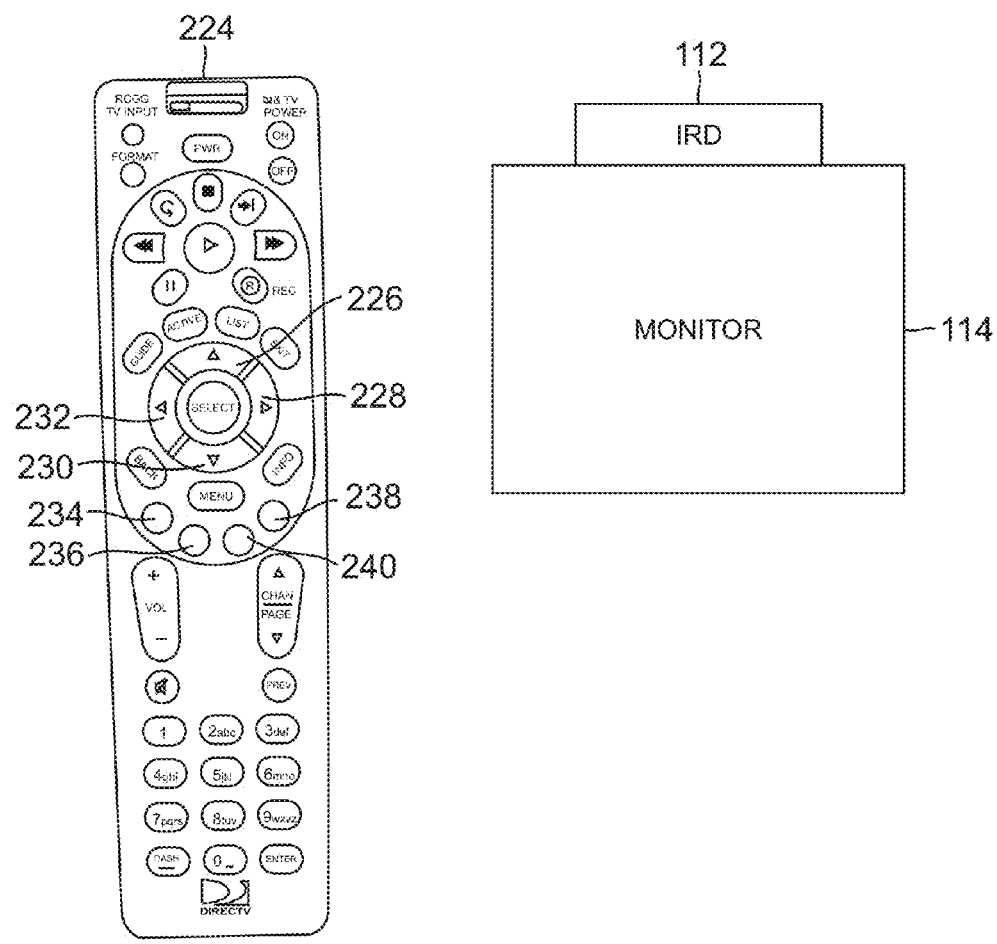
FIG. 2B illustrates a remote control used in the present invention.

FIG. 2B illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Each video cell 202A-F has an associated channel ID box 212, and one of the video cells, cell 202D, has a cursor 220 surrounding that specific video cell 202 and, optionally, channel ID box 212. This indicates that the specific video cell 202 and channel ID 212 has been selected by the viewer. The cursor 220 is typically controlled by buttons 226-232, but can be controlled by other buttons on the remote control 224 if desired.

By selecting a given video cell 202A-F, the viewer is selecting a specific characteristic associated with that given video cell 202A-F, or associated video feed used to generate that video cell 202A-F. In most instances, when the viewer selects a given video cell 202, the audio portion associated with the selected video cell 202 will be presented to the viewer, rather than the audio portion associated with the barker cell 206 or a generic audio track that is associated with interactive mosaic channel 200. Further, selection of a given video cell 202A-F with cursor 220 may also select a closed captioning data stream associated with the selected video cell 202, depending on the availability of such a data stream and/or other settings that a viewer has selected. Cursor 220 can be moved to any of the video cells 202A-F, and, optionally, can be moved to select text box 204 or control bar 210.

When cursor 220 is moved to a given video cell 202A-F via buttons 226-232, text box 204 also may undergo a change in information. Typically, when the video cell 202A-F is selected by the viewer, indicated by the presence of cursor 220, text box 204 will present the information in the Advanced Program Guide (APG) that is associated with the viewer channel selected by cursor 220. The APG typically includes information on the program or "show" that is currently being presented by the viewer channel shown in video cell 202A-F, as well as the time that show is being aired and the next show to be aired on that viewer channel. Other information, either in the APG or external to the APG, can also be displayed in the text box 204 when the cursor is moved to a given video cell 202A-F.

As such, the viewer can "interact" with the interactive mosaic channel 200 and decide which audio track to listen to, find out a plot line of each of the shows being presented in the various video cells 202, find out what is going to be aired next in the various viewer channels being presented in video cells 202, or listen to generic audio from the barker cell 206 or associated with the interactive mosaic channel 200 itself while variously viewing the video presentations in the video cells 202. If a specific video cell 202 presents video information that is of interest to a viewer, then the viewer can move cursor 220, via a remote control command, to a given video cell 202, and listen to the audio associated with that video cell 202 and find out more about that viewer channel in text box 204.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control (typically the "select" button on a DIRECTV remote control). This will tune the IRD 112 or monitor 114 to that viewer channel, which will then be presented full-screen to the viewer as in a normal television monitor 114 viewing format.

The barker cell 206, since it typically contains audio and video information that is not located on any viewer channel other than the interactive mosaic channel 200, cannot typically be selected for full screen viewing by the viewer on monitor 114. However, the barker cell 206 can be selected for full monitor 114 viewing, or at least enough of the monitor 114 to allow for changes in the video cells 202 as described below, to allow for changes in the interactive mosaic channel 200 in near-real-time.

Control Bar

The Control Bar 210 (also called the Attract Icon or the Attract Icon Bar) The control bar 210 allows for instant on-screen access to several data sources that allow the viewer to access related data to that being shown in the video cells 202A-F. Those IRDs 112 that have interactive capabilities have special buttons that correspond to the icons that appear on the control bar 210. Each icon/button directs the viewer to a different screen, such as medal count, team USA, Olympic TV coverage, event results, individual athlete or team performance, etc. Each screen can have sub-screens that further allow related data to be viewed or otherwise analyzed by the viewer.

For example, and not by way of limitation, one of the remote control 224 buttons, e.g., the "red" button 234, indicated by text and/or graphics 214, may take a viewer to the Medal Count page, where viewers can access a page listing or other audio/video presentation listing of an up-to-the-minute medal count for every country that is participating, or for at least every country that has won a medal. As a viewer scrolls through the listing, the cursor will highlight an individual country, and, when that country is selected, a sub-page will appear on monitor 114, which lists specific medal-winning events for the selected country.

Similarly, a "results" page can be accessed by pressing a different button on the remote control 224, e.g., the "green" button 236, where viewers can access up-to-the-minute scores of events in progress, as well as completed events. This list can be sorted by day, where the current day can be the default page, but viewers can go back in time to see prior days if desired. Further, a viewer can click on an "events" icon which may be accessible from the Control Bar or from the Results page that allows access to a schedule of all Olympic events, the schedule searchable by day or by event. So, if a viewer is interested in all of the bobsled (or bobsleigh) events, a viewer can search for these events, find out which channels are showing these events, and use the other features of the IRD 112 to provide reminders to the viewer that these events are on, automatically tune to these events if the viewer is watching another channel when these events are being shown, or to record these events for viewing at a more convenient time.

The events page can also indicate whether the event has already occurred, in which case the event page can show a listing of results, or is in the future, in which case the day and time for the event occurrence and/or programming can be displayed to the viewer.

An event TV schedule can also be accessed by pressing another button on the remote control 224, e.g., the "blue" button 238, indicated by graphics 216, which provides viewers a schedule of televised events featured. This is also searchable by day, by network, or by specific event.

Further, another button on the remote control 224, e.g., the "yellow" button 240, indicated by graphics 222, can take the selected video cell 202A-F to a full screen position, or to another position such as an L-wrap position, by pressing the indicated button on the remote control.

When a viewer arrives at a given interactive mosaic channel 200, the position of cursor 220 may default to the barker cell 206, to a given video cell 202A-F, to the text box 204, or default to not being present at all. The viewer may have to press a button on the remote control to activate the cursor 220. Typically, a viewer moves the cursor 220 by using the up/down/left/right keys on a remote control associated with the IRD 112, but other methods can be used without departing from the scope of the present invention. Further, if IRD 112 is not enabled for any or enough interactive services, the cursor 220 functions and the buttons 234-240 may be disabled, either entirely or partially, depending on the capabilities of IRD 112. Other buttons other than the buttons 226-240 shown can be used to perform similar functions or interactions with IRD 112 and/or monitor 114 without departing from the scope of the present invention.

There can also be the ability to record interactive mosaic channel 200 which will allow a viewer to record what would be several viewer channels as a single viewer channel, i.e., the recorded interactive mosaic channel 200. However, a recorded version of interactive mosaic channel 200 may act differently than a live-feed interactive mosaic channel 200, because the cursor 220 functions may no longer be consistent with a recorded version of that video information. For example, selection of a video cell 202A-F, in a live-feed version, would tune the IRD 112 to the channel number associated with that video cell 202. When it is a recorded version, selection of that video cell would not tune the IRD 112 to the channel number, but would likely present that recorded video information in a full-monitor 114 format, with possible degradation of picture quality. The ability to record interactive mosaic channel 200 may also be selectively disabled if desired.

Specific Event Mix Channel Features

Figure 3:
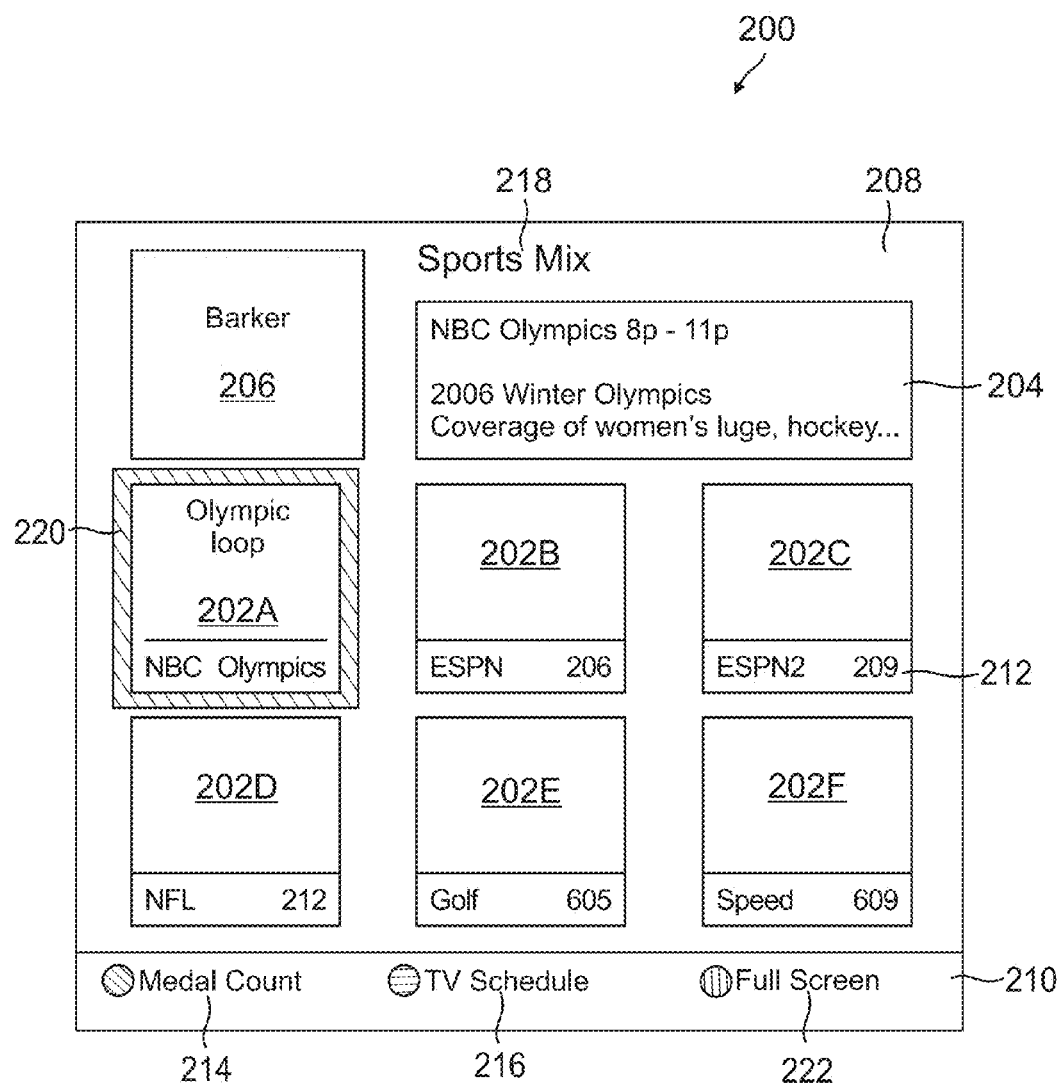
FIG. 3 illustrates another six-cell matrix with a generic video feed in accordance with the present invention.

FIG. 3 illustrates another six-cell matrix with a generic video feed in accordance with the present invention.

During certain times of the year, or, in the case of the Olympics or other special events, a given mosaic channel 200 can be programmed to offer feature presentations that differ from other mosaic channel 200 video presentations. For example, during Olympic Games coverage, a Sports Mix mosaic channel 200 can offer special Olympics features, comprising previews of key events and interviews with top United States athletes, either on the barker cell 206 or on one or more of the video cells 202A-F. Further, IRDs 112 that further comprise DVR capabilities can opt-in to receiving more in-depth coverage of Olympic features, comprising previews of key events and interviews with top US Olympic Prospects, as well as personal interviews. Many of these audio/video presentations can be exclusive to the mosaic channel 200, and, as such, provide unique programming within system 100 that is not available on broadcast television.

By tuning to such a mosaic channel 200, viewers can quickly view and navigate all of the special event, e.g., Olympic Games, coverage from one "home" channel on their television. Further, there can be additional programming, such as Olympic Highlights packages, previews and reviews of key events of the day, and recap shows for specific events such as figure skating, that can be presented on such a mosaic channel 200.

Barker cell 206 can air Olympic Preview Segments, typically with a running time of two minutes per segment, with a number of segments running on a schedule. These segments can be interleaved with other barker cell 206 video and audio clips to create a custom barker cell 206 that changes when the events that are about to be shown on other video cells 202A-F are about to be aired. For example, and not by way of limitation, the barker cell 206 may run a segment about a top US figure skating prospect, and a video segment about all of the top figure skaters worldwide, that are going to be competing later on that same evening, such programming to be viewed on one of the video cells 202A-F. After that competition is over, the barker cell 206 would likely run a different segment about a different sport, or run a highlights package about the figure skating competition, rather than a preview of the competition after the competition is concluded.

Network Coverage

During non-network coverage of the Olympics, when other non-broadcast networks are offering Olympic coverage, the other networks are brought into the mosaic channel 200 video cells 202A-F. So, for example, cell 202E, which may ordinarily be the Golf Channel, would be replaced with USA Network during USA Network's Olympic coverage.

However, when there is network (NBC) coverage of the Olympics, rather than show the network coverage in cell 202A, a video clip of previews for the network coverage would run in video cell 202A of the mix channel 200. If desired, the barker cell can be removed or blacked out during network coverage of the Olympics. If cell 202A is selected when the loop is playing, the IRD 112 tunes to the local network affiliate channel that is carrying the Olympics.

When the video loop is running in video cell 202A, the program description which is in text box 208 is updated from a source outside of the Automated Program Guide, typically from a local affiliate, or from an east-coast affiliate or a west-cost affiliate of the network airing the event. Video cell 202A that is showing the loop may also receive a different moniker or title in ID box 212 than the other video cells that are showing channel number. For example, and not by way of limitation, the moniker in the ID Box 212 associated with video cell 202A may change to "NBC Olympics" rather than "NBC" in video cell 202A, as shown in FIG. 3.

Channel Tuning Behavior

When cell 202A is running the Olympic preview video loop, and cell 202A is selected by a user, the IRD 112, via software and/or hardware, tunes to the local broadcast affiliate because the proper local affiliate station number has been programmed into the IRD 112 during the setup of the mix channel. Depending on the time zone of the viewer, the direct-tuning to the local network affiliate may or may not result in viewing Olympic coverage. For example, and not by way of limitation, Olympic event coverage may occur between 8 and 11 pm regardless of which time zone a viewer is in. So, if it is 9 pm in the Eastern Time Zone, all mix channels will have the video loop running to show previews of today's upcoming events running in cell 1, but when a viewer in the Pacific Time Zone attempts to direct tune to their local affiliate, it will not show Olympic coverage; it will show whatever program is currently showing on the Pacific Time Zone local affiliate. As such, the present invention allows for a single mix channel to be programmed differently based on time zone.

The present invention also comprises an interactive application that allows for up-to-the-minute features such as medal counts, updates on Team USA, and the entire television schedule for the Olympics.

Monitor Displays

Figure 4:
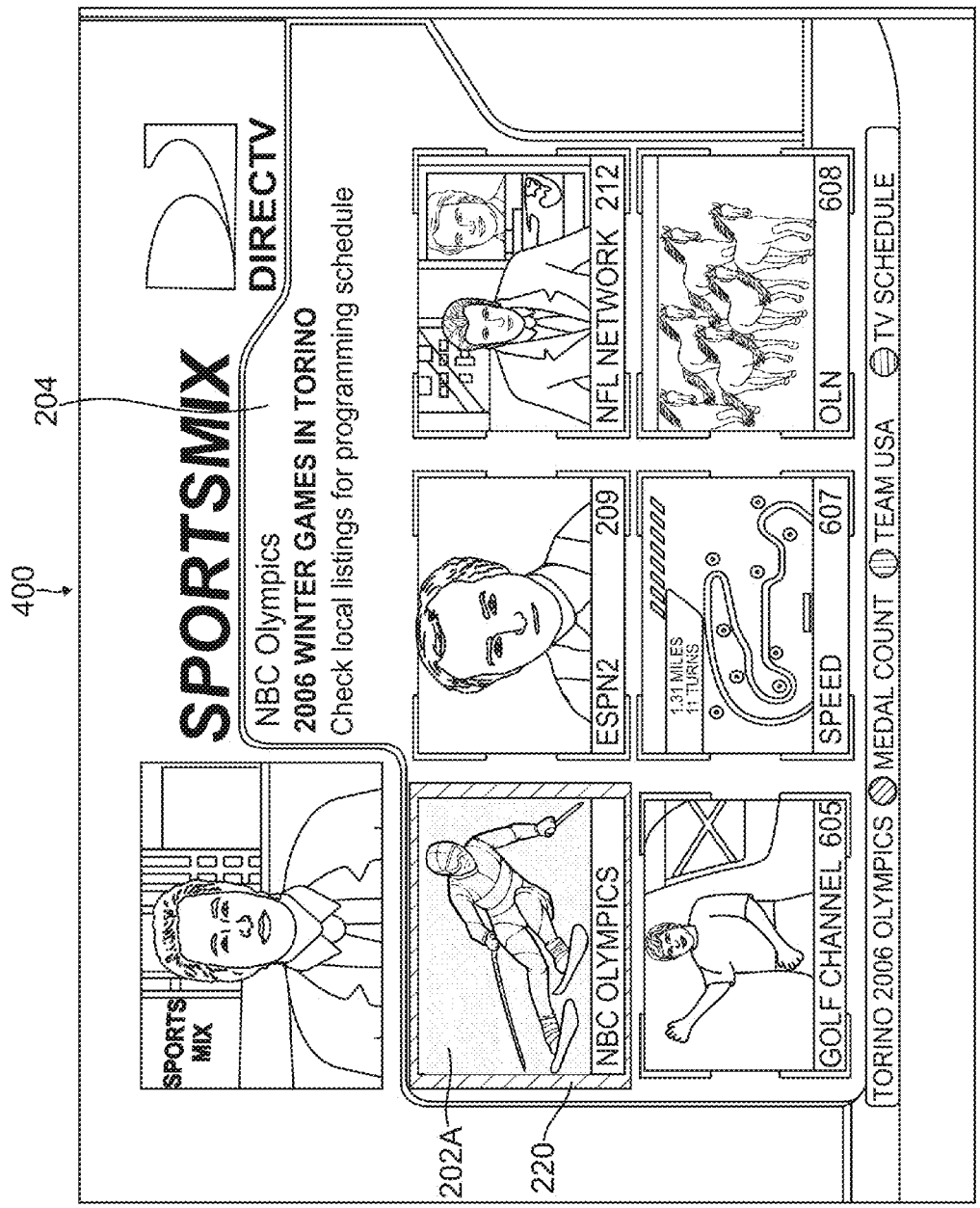
FIG. 4 illustrates an on-monitor display of a typical six-cell matrix with a generic video feed in accordance with the present invention.

FIG. 4 illustrates an on-monitor display of a typical six-cell matrix with a generic video feed in accordance with the present invention.

FIG. 4 shows a typical display 400 of a mosaic channel 200, with cursor 220 on video cell 202A.

Figure 5:
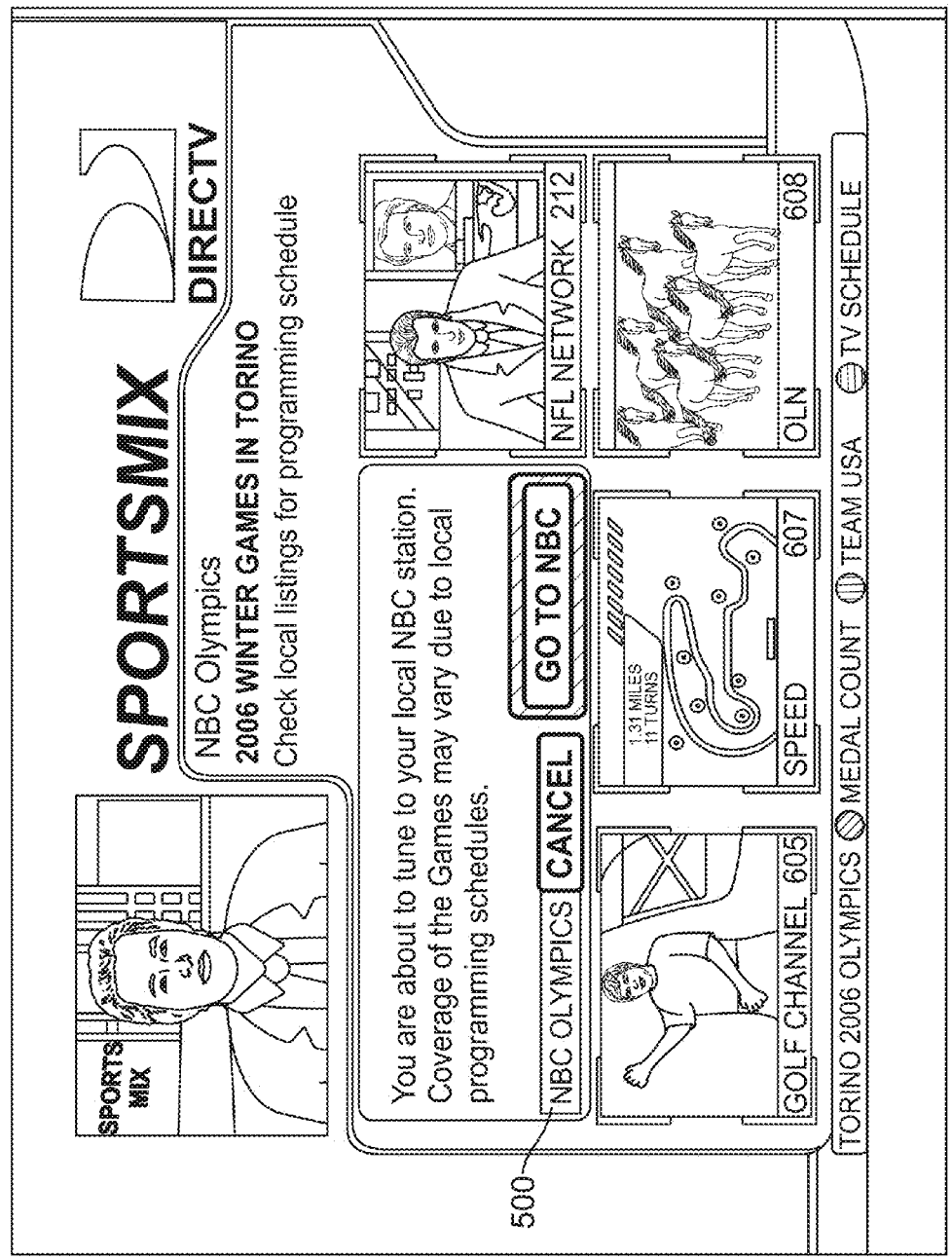
FIG. 5 illustrates a typical on-monitor display after selection of a specific video cell in accordance with the present invention.

FIG. 5 illustrates a typical on-monitor display after selection of a specific video cell in accordance with the present invention.

As described with respect to FIG. 3, when the video cell 202A is selected by the viewer (via cursor 220) while the Olympic video loop is playing, the IRD 112 is capable of directly tuning to the local broadcast affiliate. However, rather than assume that is the case, given the time zone difference, may result in viewing something other than Olympic coverage. Text box 204 may indicate that other programming is available on the network affiliate, and, as such, query 500 allows the user to either continue on to the direct tuning to the network affiliate or cancel the request.

Figure 6:
FIG. 6-8 illustrates typical on-monitor displays after selection of an icon on the display in accordance with the present invention.
Figure 7:
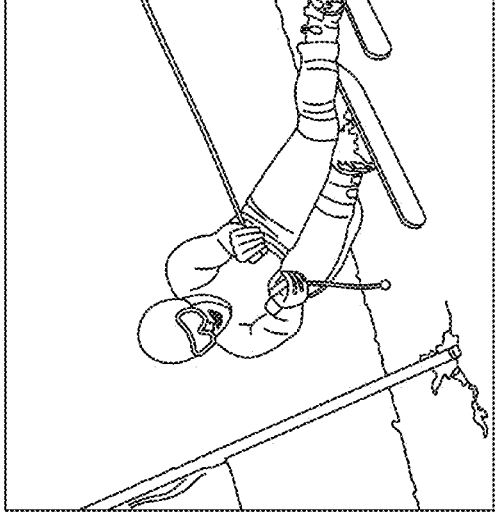
Figure 8:
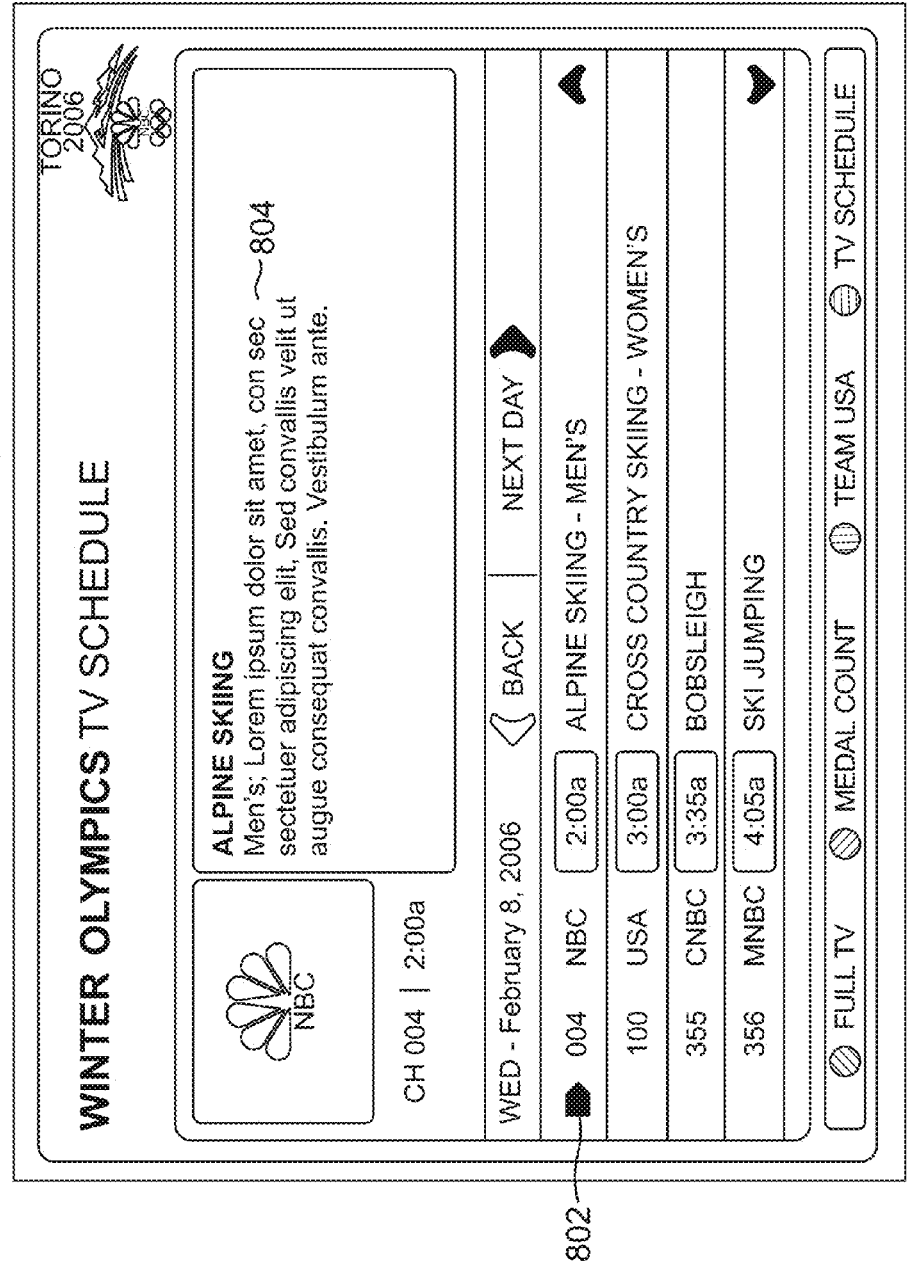

FIG. 6-8 illustrates typical on-monitor displays after selection of an icon on the display in accordance with the present invention.

As described with respect to FIG. 2A, when graphic 214 is selected, or, alternatively, when a specific button on the IRD 112 remote control is selected, monitor 114 displays a secondary screen 600, which comprises additional data that is related to one or more video cells 202A-F of the mosaic channel 200. For example, as shown in FIG. 6, a medal count by country is available to viewers within system 100 to allow them to see which countries have won which types of medals, which country is in the lead in terms of medals won, etc. Cursor 220 can be used to highlight a specific country, and another screen is displayed, which indicates which events that country won, which athletes, winning time for a given event, etc. Further, scroll bar 602, which can be operated by channel arrows or other buttons on the remote control for IRD 112, can scroll to all entries, e.g., countries, that are part of the secondary screen 600.

FIG. 7 illustrates secondary screen 700, which provides a spotlight on a specific team, e.g., Team USA, that is competing in the event. Features about individual athletes, in-depth coverage of the team as a whole or segments of the team, e.g., alpine skiing, figure skating, hockey, etc., can be selected on sub-screens via cursor 702 to provide more in-depth coverage for each of the topics presented.

FIG. 8 illustrates secondary screen 800, which is the television coverage for the event. A cursor 802 is used to select individual television coverage, and text box 804 is used to describe the expected programming for the highlighted event. Several days of programming can be viewed for the event coverage, rather than viewing all channels via the APG, each mosaic channel 200 can have a television guide to indicate to viewers the present and upcoming programming choices by mosaic channel 200, or by event, e.g., Olympic coverage.

Text box 804 provides an in-depth report of the selected program. Although this can come from the APG, such a report can also come from outside of the APG system, and typically comprises information specific to the events being shown on that program. For example, and not by way of limitation, the text box 804 for an alpine skiing event can have information on favorites in the event, past winners, skiers to watch, or other additional information, that is typically not present in the APG information. Further, outside reports can provide more timely updates to the event programming as prior portions of the event are completed, such as the compulsory programs in figure skating, pool play in hockey, etc.

Programming and Data Sources

FIG. 9 illustrates typical programming and data sources that are used within the present invention.

Typically, prior to uplink facility 118 generating uplink signal 116, headend 900 receives inputs from various sources, comprising statistical data 902, live programming 904, network programming 906, provider produced programming 908, specialty video program loops 910, and data service inputs 912. Statistical data 902 can be displayed anywhere on monitor 114 based on the desires of the program director and/or other personnel.

Each of the sources 902-912 are used in various ways to create interactive matrixed channel 200. For example, and not by way of limitation, statistical data 902 can be generated by personnel in a broadcast facility that receives raw video feeds from a given event such as the Olympics. The raw video feed may or may not be used to generate live programming 904, network programming 906, or any other source used by uplink facility 118. As an event ends, and the results are finalized, an operator can enter the winners and times into a database which is then uploaded to satellites 102-106 via uplink signal 116, allowing access to those portions of secondary screens shown in FIGS. 6-8 that require updating. So, when a given athlete receives a medal in an event, not only does that athlete's home country entry get updated with an additional medal as shown in FIG. 6, but the nested pages for that country is updated with the athlete's name, event, winning time if applicable, and other statistical data associated with that medal win. Further, FIG. 7 may be updated as well as the nested pages associated with FIG. 7, as a more in-depth report. Even if the athlete did not win, but perhaps did something else noteworthy, that data may be sent to the appropriate nested page or main page that is accessible via interactive matrixed channel 200.

Other individualized sources, e.g., statistical data 902, provider produced programming 908, specialty video program loops 910, and data service inputs 912 can be used to complete text boxes 204, 702, and 804, as well as other portions of interactive matrixed channel 200, as desired by the service provider.

CONCLUSION

The present invention comprises an interactive matrixed video channel presented on a monitor, with a plurality of individual video feeds being presented at a given time. An interactive matrixed video channel in accordance with the present invention comprises a plurality of video cells presenting at least video information, each video cell associated with one of the plurality of individual video feeds, and a text box; wherein statistical data is displayed within at least one of the group comprising the plurality of video cells and the text box, the statistical data generated from outside of the interactive matrixed video channel.

Such a channel further optionally includes a control bar displayed on the monitor, a command displayed on the control bar selecting a screen for display on the monitor, the screen comprising information related to at least one of the video cells associated with one of the plurality of individual video feeds, a cursor, wherein when the cursor selects one of the plurality of video cells, selection of a video cell from the plurality of video cells creating a new condition to be displayed on the monitor, the new condition comprising information related to the selected video cell being presented by the monitor, a barker cell presenting additional video and audio information that is selectable by the cursor, the plurality of video cells being grouped by genre, the genre being a specific event, and the specific event being selected from a group comprising an Olympic Games, a NCAA basketball tournament, and a National Football League game schedule.

A system for delivering at least one interactive matrixed video channel displayed on a video monitor, with a plurality of individual video feeds being presented at a given time in accordance with the present invention comprises at least one uplink facility, at least one satellite, receiving at least one uplink signal from the at least one uplink facility, at least one receiver, receiving at least one downlink signal from the at least one satellite, the at least one downlink signal related to the at least one uplink signal, the at least one receiver coupled to the video monitor, wherein the monitor displays a plurality of video cells presenting at least video information, each video cell associated with one of the plurality of individual video feeds, and a text box, displayed on the video monitor; wherein statistical data is displayed on the video monitor, the statistical data generated from outside of the interactive matrixed video channel.

Such a system further optionally comprises the statistical data being displayed within at least one of the group comprising the plurality of video cells and the text box, a control bar, displayed on the video monitor, a command displayed on the control bar selecting a screen for display on the monitor, the screen comprising information related to at least one of the video cells associated with one of the plurality of individual video feeds, a cursor, wherein the cursor selects one of the plurality of video cells, and selection of a video cell by the cursor creates a new condition to be displayed on the monitor the new condition comprising information related to the selected video cell, a barker cell presenting additional video and audio information that is selectable by the cursor, the plurality of video cells being grouped by genre, the genre being a specific event, and the specific event being selected from a group comprising an Olympic Games, a NCAA basketball tournament, and a National Football League game schedule.

Another system for displaying at least one interactive matrixed video channel displayed on a video monitor, with a plurality of individual video feeds being presented at a given time in accordance with the present invention comprises a transmitter, the transmitter transmitting the interactive matrixed channel, and a receiver coupled to the video monitor and receiving the transmitted interactive matrixed channel from the transmitter, wherein the monitor displays a plurality of video cells presenting at least video information, each video cell associated with one of the plurality of individual video feeds, and a text box, displayed on the video monitor; wherein statistical data is displayed on the video monitor, the statistical data generated from outside of the interactive matrixed video channel.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. An apparatus for displaying an interactive matrixed video channel in a first screen having a plurality of individual video feeds being presented at a given time, the first screen comprising:
   a plurality of video cells presenting at least video information, each video cell associated with one of the plurality of individual video feeds, the plurality of video cells including a user-selected video cell; and
   a text box concurrently displayed with the plurality of video cells;
   a control bar having a plurality of control bar icons presented concurrently with the plurality of video cells and the text box, the each of the control bar icons corresponding to only one of a plurality of user-selectable buttons of a remote control;
   wherein:
      statistical data related to video information being presented by the user-selected video cell and distinct from program guide data and previews of upcoming events distinct from program guide data are presented within at least one of the plurality of video cells simultaneously with the video information being presented and transmitted as part of the interactive matrixed video channel, the statistical data and the previews of upcoming events are generated from outside of the interactive matrixed video channel;
      a user selection of only one of the user-selectable buttons of the remote control selects a second screen for presentation that replaces the first screen, the second screen and comprising user-scrollable information having one or more user-selectable further screens replacing the second screen upon selection by the user; and
      the video feed associated with the user-selected video cell depicts a sporting event, and the user selection of the only one of the user-selectable buttons of the remote control presents a second program guide having programming of only the sporting event including future television coverage of the sporting event.

2. The apparatus of claim 1, wherein the first screen further comprises a cursor, for selecting the user selected video cell.

3. The apparatus of claim 2, further comprising a barker cell that presents additional video and audio information that is selectable by the cursor.

4. The apparatus of claim 3, wherein the plurality of video cells are grouped by genre.

5. The apparatus of claim 1, wherein the sporting event is selected from a group comprising an Olympic Games, a NCAA basketball tournament, and a National Football League game schedule.

6. A system for delivering at least one interactive matrixed video channel for display in a first screen having a plurality of individual video feeds being presented at a given time, the first screen comprising:
   at least one receiver, for receiving at least one downlink signal transmitted from at least one satellite, the at least one downlink signal related to at least one uplink signal from an uplink facility, the at least one receiver for providing a video signal generated from the at least one downlink signal for display by the video monitor the video signal comprising:
      a plurality of video cells presenting at least video information, each video cell associated with a respective one of the plurality of individual video feeds, the plurality of video cells including a user selected video cell; and
      a text box, displayed on the video monitor;
      a control bar having a plurality of control bar icons presented concurrently with the plurality of video cells and the text box, the each of the control bar icons corresponding to only one of a plurality of user-selectable buttons of a remote control;
   wherein:
      the video signal includes statistical data related to video information of the user-selected video cell and distinct from program guide data and previews of upcoming events distinct from program guide data are included within at least one of the plurality of video cells, the statistical data and previews of upcoming events transmitted simultaneously with the video information of the user-selected cell, the statistical data being in the video signal as part of the at least one interactive matrixed video channel, wherein the statistical data and the previews of upcoming events are generated from outside of the interactive matrixed video channel;
      a user selection of only one of the user-selectable buttons of the remote control selects a second screen for presentation that replaces the first screen, the second screen and comprising user-scrollable information having one or more user-selectable further screens replacing the second screen upon selection by the user; and
      the video feed associated with the user-selected video cell depicts a sporting event, and the user selection of the only one of the user-selectable buttons of the remote control presents a second program guide having programming of only the sporting event including future television coverage of the sporting event.

7. The system of claim 6, wherein the statistical data is further disposed within the text box.

8. The system of claim 6, wherein the video signal further comprises a cursor for selecting the user selected video cell.

9. The system of claim 8, wherein the video signal further comprises a barker cell that presents additional video and audio information that is selectable by the cursor.

10. The system of claim 9, wherein the plurality of video cells are grouped by genre.

11. The system of claim 6, wherein the specific event is selected from a group comprising an Olympic Games, a NCAA basketball tournament, and a National Football League game schedule.

12. A system for displaying at least one interactive matrixed video channel in a first screen having a plurality of individual video feeds being presented at a given time, the first screen comprising:
   a receiver for receiving a transmitted interactive matrixed channel, for providing a video signal comprising:
      a plurality of video cells presenting at least video information, each video cell associated with one of the plurality of individual video feeds, the plurality of video cells including a user-selected video cell; and
      a text box, displayed on the video monitor;
      a control bar having a plurality of control bar icons presented concurrently with the plurality of video cells and the text box, the each of the control bar icons corresponding to only one of a plurality of user-selectable buttons of a remote control;

wherein:

statistical data related to video information of the user-selected video cell and distinct from program guide data and previews of upcoming events distinct from program guide data are received along with the transmitted interactive matrixed channel and presented within at least one of the plurality of video cells simultaneously with the video information as part of the interactive matrixed video channel, wherein the statistical data and the previews of upcoming events are generated from outside of the interactive matrixed video channel;

a user selection of only one of the user-selectable buttons of the remote control selects a second screen for presentation that replaces the first screen, the second screen and comprising user-scrollable information having one or more user-selectable further screens replacing the second screen upon selection by the user; and the video feed associated with the user-selected video cell depicts a sporting event, and the user selection of the only one of the user-selectable buttons of the remote control presents a second program guide having programming of only the sporting event including future television coverage of the sporting event.

\* \* \* \* \*